(12) United States Patent
Chappell et al.

(10) Patent No.: US 7,425,097 B1
(45) Date of Patent: Sep. 16, 2008

(54) INERTIAL MEASUREMENT UNIT WITH WIRELESS POWER TRANSFER GAP CONTROL

(75) Inventors: Charles D. Chappell, Treasure Island, FL (US); Robert E. Johnson, Starke, FL (US); David A. Bowen, Seminole, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/778,970

(22) Filed: Jul. 17, 2007

(51) Int. Cl.
*F16C 32/06* (2006.01)
(52) U.S. Cl. .................................. 384/109; 384/108
(58) Field of Classification Search .............. 73/1.78; 74/5.8, 5.9, 572.11, 572.21, 573.1, 573.11; 244/3.2; 384/109, 114, 115, 116, 117, 118, 384/119, 120, 121, 122, 123, 124
See application file for complete search history.

(56) References Cited

U.S. PATENT DOCUMENTS

| | | |
|---|---|---|
| 1,315,735 A | 9/1919 | Michell |
| 2,363,260 A | 11/1944 | Peskin |
| 2,710,234 A | 6/1955 | Hansen |
| 2,959,060 A | 11/1960 | Kunz |
| 2,999,391 A | 9/1961 | Freebairn et al. |
| 3,039,316 A | 6/1962 | Slater |
| 3,056,303 A | 10/1962 | Naylor |
| 3,258,977 A | 7/1966 | Hoffman |
| 3,269,195 A | 8/1966 | Cahoon et al. |
| 3,328,595 A | 6/1967 | Tood, Jr. |
| 3,365,942 A | 1/1968 | Blazek |

(Continued)

FOREIGN PATENT DOCUMENTS

GB 866473 4/1961

(Continued)

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

(Continued)

*Primary Examiner*—John E. Barlow, Jr.
*Assistant Examiner*—Douglas N Washburn
(74) *Attorney, Agent, or Firm*—Fogg & Powers LLC; Gregory M. Taylor

(57) ABSTRACT

An inertial measurement unit comprises an outer case assembly including an upper gas plenum and a lower gas plenum, with upper and lower support shells surrounded by the upper and lower gas plenums. A sensor assembly includes a sensor shell, with the sensor assembly surrounded by the upper and lower support shells. A plurality of gas bearing pads extend through apertures in the upper and lower support shells and are configured to inject a first pressurized gas into a gap that separates the gas bearing pads and the sensor shell. A wireless power transfer transformer includes a power transmitting core mounted to the outer case assembly, and a power receiving core mounted in an opening of the sensor shell. The receiving core is configured to be aligned with the transmitting core for wireless power transfer. The transmitting core is configured to inject a second pressurized gas into a gap between the transmitting core and the receiving core.

20 Claims, 4 Drawing Sheets

U.S. PATENT DOCUMENTS

| | | |
|---|---|---|
| 3,439,546 A | 4/1969 | Baker et al. |
| 3,572,856 A | 3/1971 | McHugh |
| 3,576,124 A | 4/1971 | O'Connor |
| 3,670,585 A | 6/1972 | Alexander et al. |
| 3,769,710 A | 11/1973 | Reister |
| 3,782,167 A | 1/1974 | Stuelpnagel |
| 3,938,256 A | 2/1976 | Crocker, Jr. |
| 4,003,265 A | 1/1977 | Craig et al. |
| 4,143,466 A | 3/1979 | Quermann |
| 4,150,579 A | 4/1979 | Vaughn |
| 4,214,482 A | 7/1980 | Bouchard |
| 4,244,215 A | 1/1981 | Frosch et al. |
| 4,290,316 A * | 9/1981 | Noar et al. .................. 74/5.46 |
| 4,291,926 A | 9/1981 | Tomioka et al. |
| 4,413,864 A | 11/1983 | Phillips |
| 4,458,426 A | 7/1984 | O'Connor et al. |
| 4,488,041 A | 12/1984 | Baudot |
| 4,515,486 A | 5/1985 | Ide |
| 4,671,650 A | 6/1987 | Hirzel et al. |
| 4,711,125 A | 12/1987 | Morrison |
| 4,723,735 A | 2/1988 | Eisenhaure et al. |
| 4,822,181 A | 4/1989 | Egli |
| 4,917,330 A | 4/1990 | Dulat et al. |
| 5,067,084 A | 11/1991 | Kau |
| 5,088,825 A | 2/1992 | Derry et al. |
| 5,099,430 A | 3/1992 | Hirsch |
| 5,115,570 A | 5/1992 | Krogmann et al. |
| 5,319,577 A | 6/1994 | Lee |
| 5,357,437 A | 10/1994 | Polvani |
| 5,396,326 A | 3/1995 | Knobbe et al. |
| 5,410,232 A | 4/1995 | Lee |
| 5,710,559 A | 1/1998 | Krogmann |
| 5,716,142 A | 2/1998 | Kristensen et al. |
| 5,743,654 A | 4/1998 | Ide et al. |
| 5,790,049 A | 8/1998 | Harrell |
| 5,894,323 A | 4/1999 | Kain et al. |
| 6,145,393 A | 11/2000 | Canton |
| 6,172,665 B1 | 1/2001 | Bullister |
| 6,481,672 B1 | 11/2002 | Goodzeit et al. |
| 6,594,623 B1 | 7/2003 | Wang et al. |
| 6,594,911 B2 | 7/2003 | Brunstein et al. |
| 6,629,778 B1 | 10/2003 | Enderle et al. |
| 6,711,952 B2 | 3/2004 | Leamy et al. |
| 6,741,209 B2 | 5/2004 | Lee |
| 6,786,084 B2 | 9/2004 | Schroeder et al. |
| 6,802,221 B2 | 10/2004 | Hedeen et al. |
| 6,826,478 B2 | 11/2004 | Riewe et al. |
| 6,918,186 B2 | 7/2005 | Ash et al. |
| 7,003,399 B1 * | 2/2006 | Chappell .................. 701/220 |
| 7,066,653 B2 | 6/2006 | Dourlens et al. |
| 7,340,344 B2 * | 3/2008 | Chappell .................. 701/220 |
| 2002/0077189 A1 | 6/2002 | Tuer et al. |
| 2003/0120425 A1 | 6/2003 | Stanley et al. |
| 2004/0015323 A1 | 1/2004 | Boyton |
| 2004/0075737 A1 | 4/2004 | Kirby |
| 2004/0089083 A1 | 5/2004 | Bailey |
| 2004/0212803 A1 | 10/2004 | Siegl et al. |
| 2006/0058961 A1 | 3/2006 | Chappell et al. |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |

OTHER PUBLICATIONS

El-Sheimy et al., "Structural Monitoring Using Wirelessly Connected MEMS-Based Snesors-Towards System Development", Feb. 18, 2003, pp. 1-10, Publisher; ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

Ng, "The Optical Mouse as a Two-Dimensional Displacement Sensor", "Sensors and Actuators A", Oct. 1, 2003, pp. 21-25, vol. 107, No. 1, Publisher: Elseveier Sequoia S.A., Published in: Lausanne, CH.

* cited by examiner

INERTIAL MEASUREMENT UNIT WITH WIRELESS POWER TRANSFER GAP CONTROL

RELATED APPLICATIONS

This application is related to commonly assigned U.S. patent application Ser. No. 11/004,184, filed on Dec. 3, 2004, entitled "GAS SUPPORTED INERTIAL SENSOR SYSTEM AND METHOD" which is incorporated herein by reference.

This application is also related to commonly assigned U.S. patent application Ser. No. 11/622,226, filed on Jan. 11, 2007, entitled "METHOD AND SYSTEM FOR WIRELESS POWER TRANSFERS THROUGH MULTIPLE PORTS" which is incorporated herein by reference.

This application is also related to commonly assigned U.S. patent application Ser. No. 11/778,965, filed on even date herewith, entitled "INERTIAL MEASUREMENT UNIT WITH GAS PLENUMS" which is incorporated herein by reference.

BACKGROUND

Precision inertial navigation systems are used in civil and military aviation, missiles and other projectiles, submarines and other underwater vehicles, space exploration technology, as well as in numerous other vehicle applications. A typical inertial navigation system (INS) measures the position and attitude of a vehicle by measuring the accelerations and rotations applied to the vehicle's inertial frame of reference. Since the typical INS is not dependent on other points of reference, it is resistant to jamming and deception.

An INS usually includes an inertial measurement unit (IMU) combined with control mechanisms, allowing the path of a vehicle to be controlled according to the position determined by the INS. An IMU contains instruments for position monitoring. A conventional INS requires concentric sets of ball bearing supported gimbals that allow instruments to freely rotate in vehicle maneuvers and further allow for manipulation during a calibration routine.

An INS typically uses either gyrostablized platforms or 'strapdown' systems. The gyrostabilized system allows a vehicle's roll, pitch and yaw angles to be measured directly at the bearings of the gimbals. The INS is traditionally rotated using electromagnetic motors on a ball bearing supported gimbal axis. Disadvantages of this scheme is that it employs multiple expensive precision mechanical parts including moving parts that can wear out or jam, and is vulnerable to gimbal lock. In addition, for each degree of freedom, another gimbal is required thus increasing the size and complexity of the INS. Therefore, to get complete three dimensional calibration, at least three gimbals are needed.

A typical inertial sensor assembly (ISA) within the INS is an electronic device that contains internally embedded instrumentation (e.g., one or more accelerometers and gyroscopes) that communicates with other vehicle systems. Data from the internally embedded instrumentation is typically communicated to the other vehicle systems through moving contact devices, such as slip rings or twist caps. The slip rings and twist caps provide a constant communication link for the data without restricting the movement of the ISA.

However, the slip rings and twist caps (along with the ball bearing supported gimbals) are moving physical structures subject to wear. Multiple slip rings and twist caps represent potential failure points for the typical INS. Similarly, transferring supply power to the ISA through the multiple slip rings and twist caps is subject to interference due to electrical noise. Moreover, receiving the supply power through the moving contact devices is restricted in applications where the gimbals are absent and physical contact with the ISA is prohibited.

SUMMARY

The present invention is directed to an inertial measurement unit that comprises an outer case assembly including an upper gas plenum and a lower gas plenum. An upper support shell is surrounded by the upper gas plenum, with the upper support shell having a plurality of apertures. A lower support shell is surrounded by the lower gas plenum, with the lower support shell having a plurality of apertures. A sensor assembly includes a sensor shell having an outer surface, with the sensor assembly surrounded by the upper and lower support shells. A plurality of gas bearing pads extends through the apertures in the upper and lower support shells. The plurality of gas bearing pads are configured to receive a first pressurized gas from the upper and lower gas plenums and inject the first pressurized gas into a gap that separates the gas bearing pads and the sensor shell. This produces a first gas bearing that allows the sensor assembly to be freely suspended and rotated in all directions. The inertial measurement unit also comprises at least one wireless power transfer transformer that includes a power transmitting core mounted to the outer case assembly, and a power receiving core mounted in an opening of the sensor shell. The power receiving core is configured to be aligned with the power transmitting core for wireless power transfer. The power transmitting core is configured to inject a second pressurized gas into a gap between the power transmitting core and the power receiving core. This produces a second gas bearing that maintains a predetermined separation distance between the power transmitting core and the power receiving core during the wireless power transfer.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It should be understood that other embodiments may be utilized without departing from the scope of the present invention. The following detailed description is, therefore, not to be taken in a limiting sense.

The present invention is related to an inertial measurement unit (IMU) with wireless power transfer gap control. An internal sensor assembly in the IMU is configured to rotate for self calibration. Power needs to be transmitted to the sensor assembly without limiting its rotational freedom and without a mechanical wear out mechanism. This is accomplished with a wireless power transfer transformer to induce a power transfer across a small gap. The smaller the gap, the higher the efficiency of the power transfer. This invention minimizes the gap by utilizing pressurized gas to act as a gas bearing between a pair of power transfer cores.

A method for wireless power transfer in an inertial measurement unit according to the invention generally comprises aligning a power receiving core in a sensor assembly with a power transmitting core external to the sensor assembly. A pressurized gas is injected through the power transmitting core into a controlled gap between the power transmitting core and the power receiving core to produce a gas bearing. A wireless power signal is then transmitted from the power transmitting core to the power receiving core.

By creating a small film of high pressure gas between the power transmitting core, which can be mounted to a vehicle casing, and the power receiving core located on the rotating IMU, the gap is held to a very small distance by the film of gas acting as a bearing. Gas bearings have very stiff spring rates and operate with increased stiffness as the gap is decreased. The transmitting core has a spring loaded mounting stem that preloads the transmitting core toward the receiving core with the gas bearing opposing that spring force. This provides geometric alignment between the two cores and minimizes the gap with little if any need for manual adjustment.

While the present invention is particularly useful in a precision inertial guidance system such as used in strategic missiles, other industrial air bearing or rotating element applications may also find use for the present gas bearing gap, such as to control the critical spacing of a wireless inductive power transfer system.

Further details of the present invention are discussed as follows with respect to the drawings.

Figure 1:
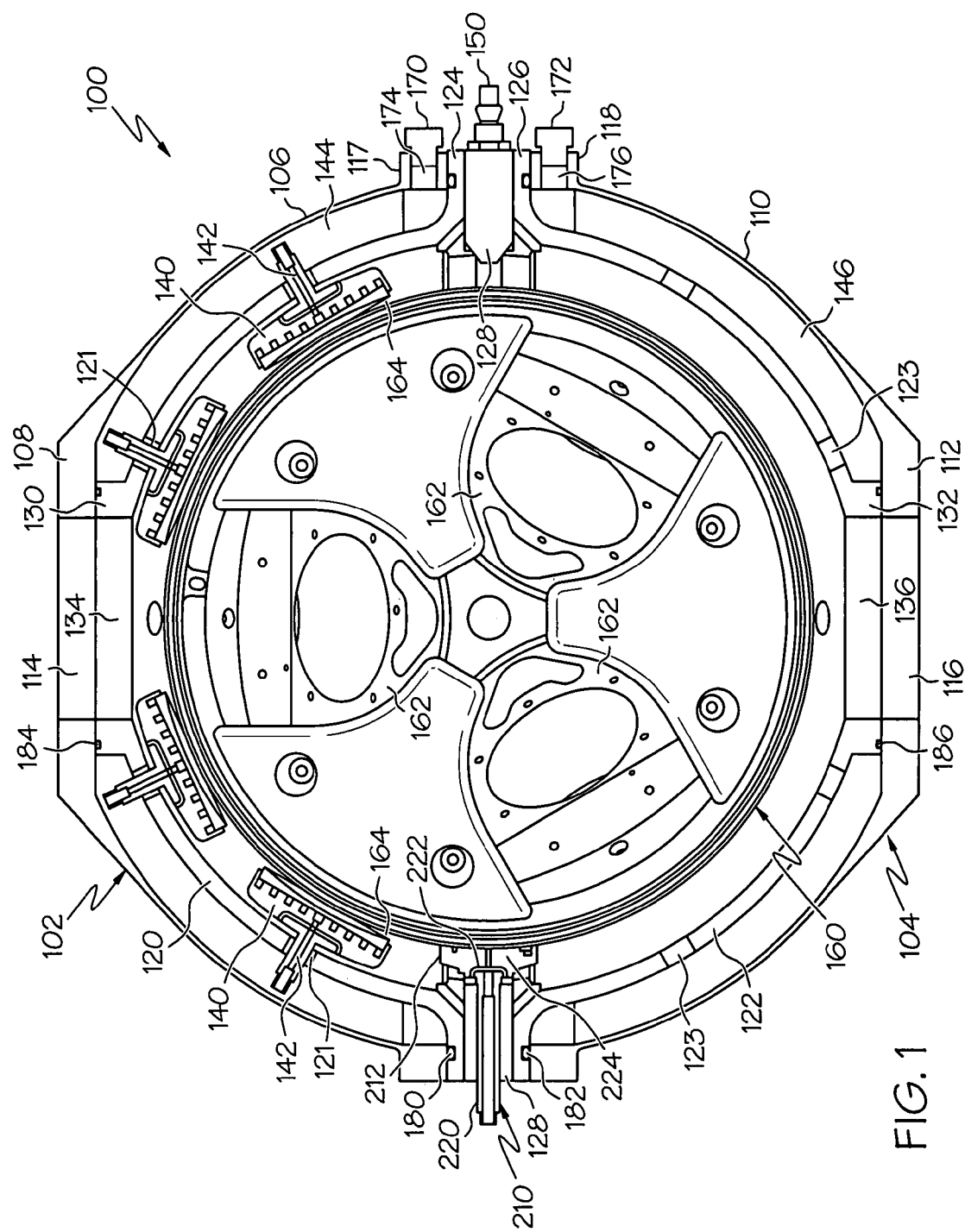
FIG. 1 is a cut away side view of an outer case assembly for an inertial measurement unit according to one embodiment.

FIG. 1 is a cutaway view of a stationary outer case assembly 100 for an IMU according to one embodiment. The outer case assembly 100 includes an upper gas plenum 102 and a lower gas plenum 104. The upper gas plenum 102 comprises an upper side portion 106 having a first thickness and an upper rim portion 108 having a second thickness that is greater than the first thickness of side portion 106. Likewise, the lower gas plenum 104 comprises a lower side portion 110 having a first thickness and a lower rim portion 112 having a second thickness that is greater than the first thickness of side portion 110. The side portion 106 of upper gas plenum 102 gradually tapers in thickness to rim portion 108 that is adjacent to the top of outer case assembly 100. Likewise, side portion 110 of lower gas plenum 104 also gradually tapers in thickness to rim portion 112 that is adjacent to the bottom of outer case assembly 100.

The thicker rim portions 108, 112 of the gas plenums near the top and bottom of outer case assembly 100 are configured to handle the stress of high pressure gas in the plenums. The rim portions 108, 112 also define respective upper and lower gas outlets 114, 116 for gas exiting outer case assembly 100. The upper and lower gas plenums 102, 104 have respective plenum flanges 117, 118. The gas plenums 102, 104 can be adapted to provide radiation shielding for outer case assembly 100. Such radiation shielding is described in further detail in copending U.S. application Ser. No. 11/778,965.

An upper support shell 120 is surrounded by upper gas plenum 102 and has a plurality of apertures 121. A lower support shell 122 is surrounded by lower gas plenum 104 and has a plurality of apertures 123. The upper and lower support shells 120, 122 have respective shell flanges 124, 126 that are attached to a mounting plate 128 on upper and lower surfaces thereof. The plenum flanges 117, 118 are respectively attached to shell flanges 124, 126. The plenums flanges and shell flanges can be attached by any suitable fasteners such as bolts, screws, rivets, or the like.

The upper and lower support shells 120, 122 have respective lip portions 130, 132 that are contiguous with rim portions 108, 112 of the gas plenums near the top and bottom of outer case assembly 100. The lip portions 130, 132 define respective top and bottom openings 134, 136 that communicate with upper and lower gas outlets 114, 116.

The support shells 120, 122 are adapted to receive a plurality of individually adjustable gas bearing pads 140 through apertures 121, 123 in the support shells. The gas bearing pads 140 have hollow stems 142 that extend through apertures 121, 123. In one embodiment, gas bearing pads 140 are adapted to be received into threaded apertures in support shells 120, 122. Further details of suitable gas bearing pads are described in copending U.S. application Ser. No. 11/778,965.

An upper gas chamber 144 is formed between upper gas plenum 102 and the outer surface of upper support shell 120. A lower gas chamber 146 is formed between lower gas plenum 104 and the outer surface of lower support shell 122. The gas chambers 144, 146 provide high pressure zones for gas that is injected into outer case assembly 100.

An upper gas inlet is provided in mounting plate 128 and is in communication with upper gas chamber 144. A jet nozzle 150 is coupled to the upper gas inlet. Similarly, a lower gas inlet is also provided in mounting plate 128 and is in communication with lower gas chamber 146. A jet nozzle is also coupled to the lower gas inlet. High pressure gas, such as air or nitrogen, can be directed through the jet nozzles into the gas inlets and passes into the high pressure zones of gas chambers 144, 146, which are configured to distribute the pressurized gas evenly to gas bearing pads 140.

A sensor shell 160 for a sensor assembly is surrounded by the upper and lower support shells 120, 122. As depicted in FIG. 1, sensor shell 160 includes internal fastening structures 162 that are configured to secure embedded instrumentation (not shown) within the sensor assembly, such as gyroscopes, accelerometers, and the like. The sensor shell 160 can have an outer surface with a substantially spherical shape such that the sensor assembly is in the form of a ball. The sensor shell 160 can be made from a metallic material such as aluminum.

As shown in FIG. 1, upper and lower support shells 120, 122 can have a substantially hemispherical shape. The upper and lower gas plenums 102, 104 also have a substantially hemispherical shape. While the support shells and plenums are shown with a hemispherical shape to closely encase the spherical-shaped sensor shell, other shapes can be utilized depending on the shape of the sensor assembly. For example, in an alternate embodiment the outer sensor shell of the sensor assembly can have a cylindrical shape suited for encapsulating sensor instrumentation and allowing for suspension and rotation of the sensor assembly in a single axis of rotation. The support shells and plenums in this alternate embodiment would have a corresponding cylindrical shape to closely encase the sensor assembly.

The upper and lower support shells 120, 122 have a larger diameter than sensor shell 160 to allow for mounting of gas bearing pads 140. The gas bearing pads 140 and the outer spherical surface of sensor shell 160 are separated by a narrow gap 164 when pressurized gas is fed through the gas bearing pads. This creates a gas bearing that allows sensor shell 160 to be freely suspended and rotated in all directions.

A first pressure relief valve 170 is coupled to upper gas plenum 102 at flange 117 adjacent to jet nozzle 150. A second pressure relief valve 172 is coupled to lower gas plenum 104 at flange 118 also adjacent to jet nozzle 150. The flanges 117 and 118 adjacent to jet nozzle 150 define respective ports 174 and 176 that are in communication with gas chambers 144 and 146, respectively. The valves 170 and 172 are movably inserted into ports 174 and 176, respectively, to provide pressure relief for gas chambers 144 and 146.

An O-ring 180 is disposed in a slot that circumscribes shell flange 124, and an O-ring 182 is disposed in a slot that circumscribes shell flange 126. The O-rings 180, 182 respectively provide a fluid-tight seal between shell flanges 124, 126 and plenum flanges 117, 118 attached thereto. An O-ring 184 is disposed in a slot on a surface of lip portion 130 of upper support shell 120 to provide a fluid-tight joint between lip portion 130 and rim portion 108 of gas plenum 102. An O-ring 186 is disposed in a slot on a surface of lip portion 132 of lower support shell 122 to provide a fluid-tight joint between lip portion 132 and rim portion 112 of gas plenum 104.

A wireless power transfer transformer 210 is disposed in a high pressure gas inlet of mounting plate 128. The transformer 210 has a power transmitting core 212 including a hollow mounting stem 220 coupled to a spring cushion joint 222 and an gas pad 224. The transformer 210 also has a power receiving core (not shown). A hose can be coupled to stem 220 to provide pressurized gas to power transmitting core 212. Further details with respect to transformer 210 are discussed hereafter.

Figure 2:
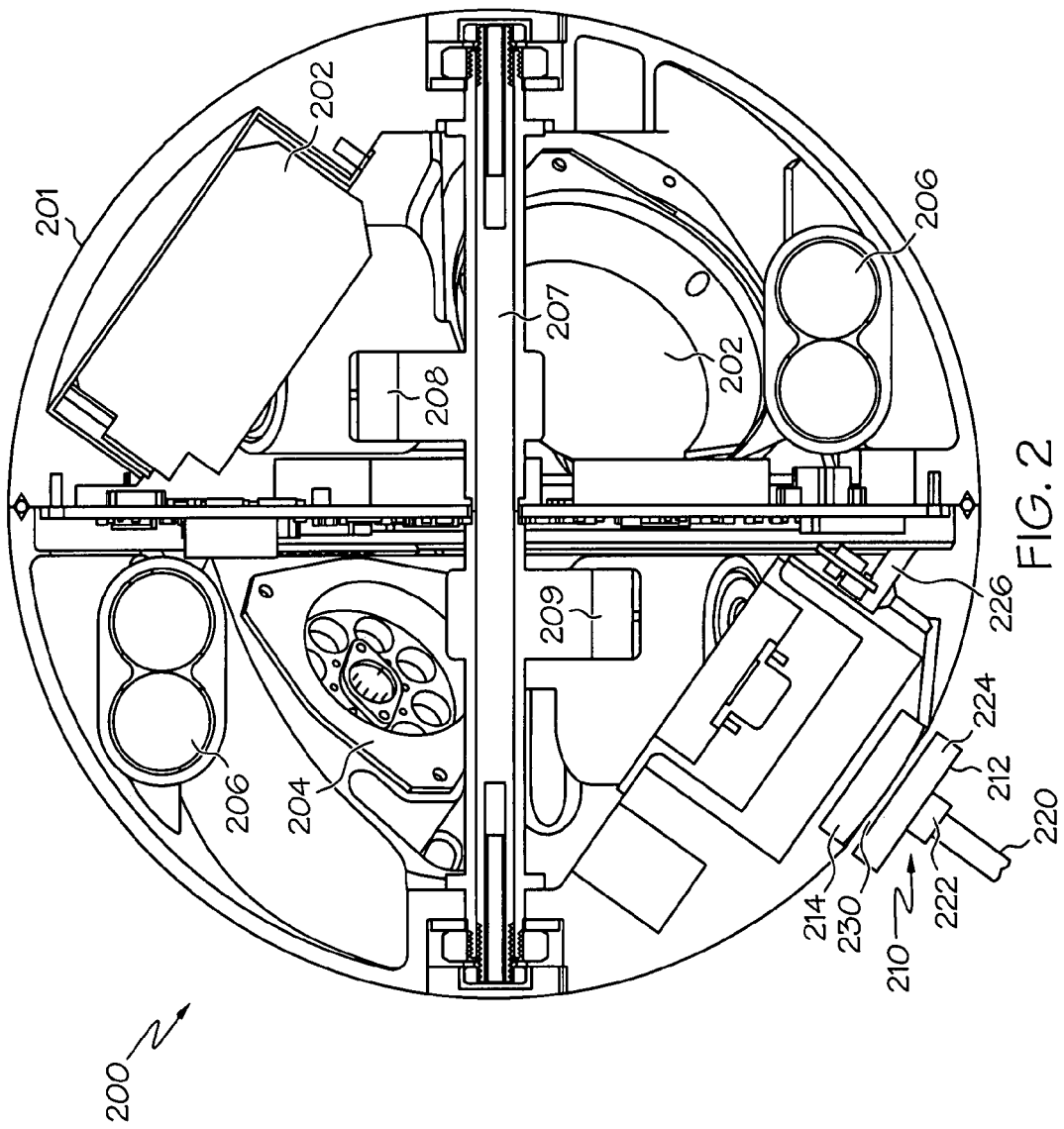
FIG. 2 is a cut away side view of a sensor assembly for an inertial measurement unit having a wireless power transfer transformer.

FIG. 2 is a cut away view of a sensor assembly 200 that has embedded instrumentation in a spherical sensor shell 201. The sensor assembly 200 can be implemented within the outer case assembly 100 of an IMU as shown in FIG. 1. The embedded instrumentation within sensor assembly 200 can include one or more gyroscopes 202, one or more accelerometers 204, a rechargeable power source such as one or more batteries 206, as well as other electronic components such as a processor. The gyroscopes sense rotation in any of three axes, and the accelerometers measure acceleration in any of three directions. An axle 207 is disposed in the middle of sensor assembly 200 and has two eccentric weights 208, 209 that point in opposite directions. This configuration for axle 208 provides an external balance mechanism for sensor assembly 200.

The sensor assembly 200 is configured to communicate sensor data from the embedded instrumentation to a controller or processor for the IMU. The sensor data can include data collected from outputs of the embedded instrumentation, system health indicators and alarms (e.g., battery power level and component failure indications), and programming and control instructions for electronic components within the embedded instrumentation. The sensor assembly 200 can measure the position and attitude of a vehicle in which it is mounted by measuring the accelerations and rotations applied to the vehicle's inertial frame. For example, if sensor shell 201 rotates, the gyroscopes sense motion and transmit sensor data to the processor. If sensor shell 201 translates or moves, the accelerometers sense velocity/acceleration and send sensor data to the processor. The processor can calculate the position of the sensor shell and the direction it is pointed at any given time anywhere in space.

As discussed above, the wireless power transfer transformer 210 has power transmitting core 212, which includes hollow mounting stem 220 coupled to spring cushion joint 222 and gas pad 224. As shown in FIG. 2, transformer 210 also includes a power receiving core 214 that is mounted in an opening of sensor shell 201, such that the outer surface of power receiving core 214 is flush with the outer surface of sensor shell 201.

The power receiving core 214 is configured to be aligned with power transmitting core 212 for wireless power transfer in order to charge batteries 206. While only a single wireless power transfer transformer 210 is shown in FIGS. 1 and 2, it should be understood that one or more additional wireless power transfer transformers can be implemented in different locations around sensor assembly 200 as desired.

The receiving core 214 is coupled to charging coil electronics 226 in sensor assembly 200. The transmitting core 212 and receiving core 214 are separated by a narrow gap 230 that is maintained by high pressure gas supplied through mounting stem 220. The high pressure gas provides a gas bearing to keep transmitting core 212 and receiving core 214 separated. The nature of gas bearings is to have a small but firm gap between the two halves of the bearing. The present implementation creates the gas bearing with transmitting core 212 and receiving core 214 as the two halves of the bearing. The spring cushion joint 222 placed behind the transmitting core 212 allows for self adjustment of transmitting core 212 relative to receiving core 214 to account for tolerance and to continuously optimize gap 230 at all attitudes of the IMU.

During operation of an IMU having outer case assembly 100 and sensor assembly 200, pressurized gas is directed through the jet nozzles and is distributed in the high pressure zones of gas chambers 144, 146. The pressurized gas is then fed through hollow stems 142 of bearing pads 140 from the gas chambers to provide a high pressure gas bearing between bearing pads 140 and the outer surface of sensor shell 160 (201). The gas bearing allows the sensor shell to rotate freely in a near frictionless environment, which provides for easy calibration of sensors in the sensor shell.

When batteries 206 inside sensor assembly 200 require additional electrical charge, a controller aligns receiving core 214 with transmitting core 212 to transfer wireless power signals from a power supply connected to the transmitting core. The bearing pads 140 keep sensor assembly 200 suspended to allow for rotation and alignment of receiving core 214 with transmitting core 212. Once aligned, transmitting core 212 and receiving core 214 are separated by the controlled gap having a gas bearing to complete the wireless power transfer. In an exemplary implementation, the controlled gap can provide a separation distance of about 0.001 inch (0.0254 mm) or less between the transmitting core and the receiving core. The separation distance of the gap is maintained at a precise value by the gas bearing created by the transmitting core, providing for efficient power transfer.

Figure 3:
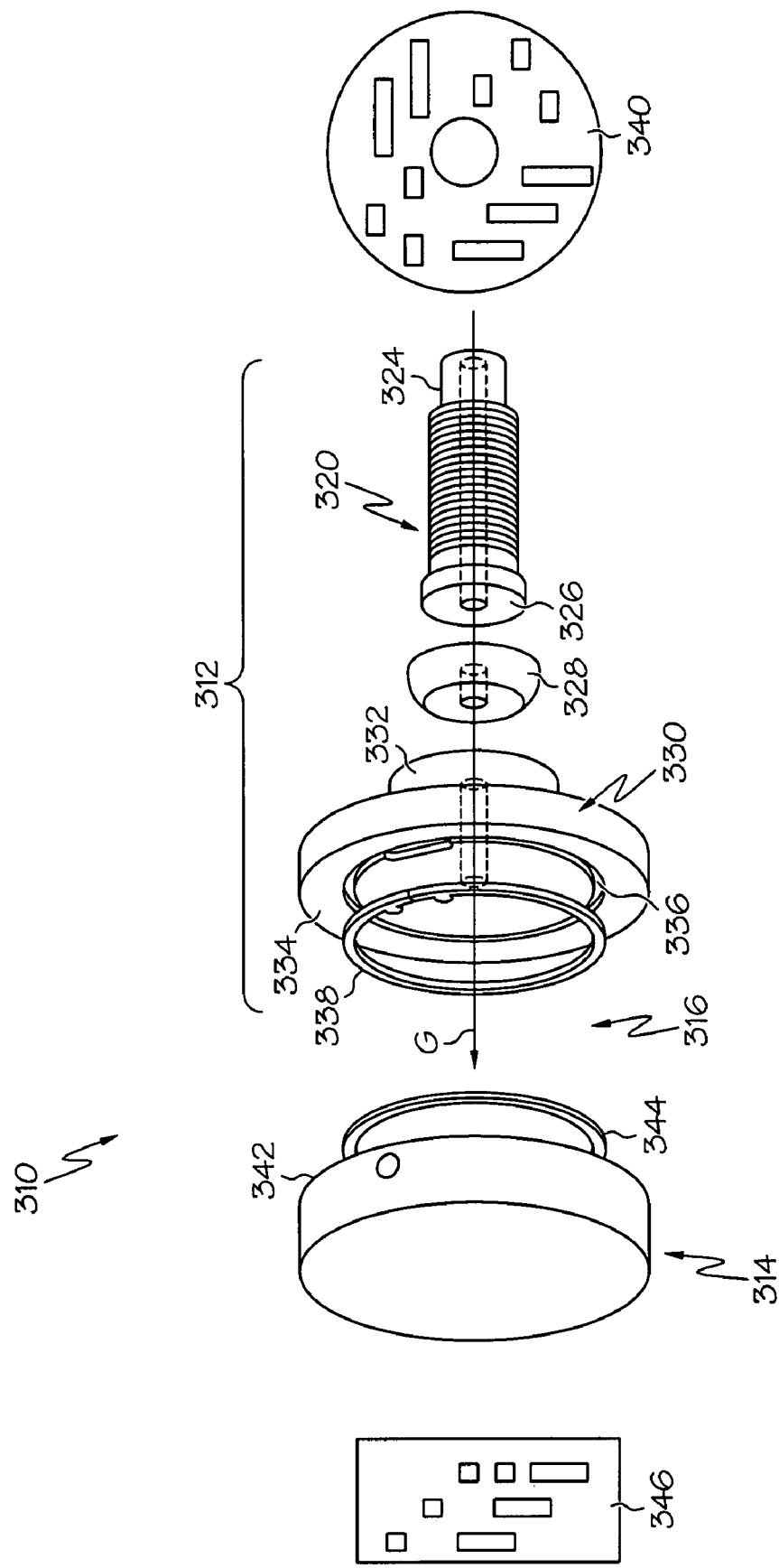
FIG. 3 is an exploded perspective view of a wireless power transfer transformer for use in an inertial measurement unit.

FIG. 3 is an exploded perspective view of a wireless power transfer transformer 310 according to one embodiment. The transformer 310 can be implemented in an IMU and sensor assembly such as described previously for transformer 210. The transformer 310 includes a casing mountable power transmitting core 312, and a power receiving core 314 that is mountable in a sensor assembly. The transmitting core 312 and receiving core 314 are configured to face each other during a power transfer and are separated by a controlled gap 316.

The transmitting core 312 has a hollow mounting stem 320 defining a plenum that supplies high pressure gas. The stem 320 has an inlet 324 and an outlet 326. An elastomeric joint 328 having an opening therethrough is configured to cover outlet 326. The elastomeric joint 328 provides a spring cushion that allows for self alignment, axial motion, and radial adjustment of transmitting core 312 to adjust the controlled gap 316 based on gas pressure. A gas pad 330 is configured to mate with elastomeric joint 328 and stem 320 through receptacle 332. The gas pad 330 has a central hole for directing high pressure gas to controlled gap 316 to form a gas bearing therein. The gas flow path through transmitting core 312 is shown by the arrow G. The gas pad 330 has an outer surface 334 with a circular groove 336 for holding a single coil winding 338. The transmitting core 312 is configured to be electrically coupled to external charging coil electronics 340.

The receiving core 314 has an outer surface 342 that faces outer surface 334 of gas pad 330. In one implementation, outer surface 334 of gas pad 330 has a substantially spherical concave shape, and outer surface 342 of receiving core 314 has a corresponding substantially spherical convex shape to allow controlled gap 316 to be as uniform as possible. The spherical convex shape of outer surface 342 is configured to match the outer curvature of a spherical sensor shell that utilizes transformer 310. The pressurized gas, the elastomeric joint, and the core curvatures all work in conjunction to provide a stationary, controlled gap 316.

The outer surface 342 of receiving core 314 is configured to hold a single coil winding 344 that faces coil winding 338 of gas pad 330. The receiving core 314 is configured to be electrically coupled to internal charging coil electronics 346. The single coil windings 338 and 344 can be formed from wound magnetic materials such as ferrite materials, and act as coupled inductors to transfer power.

Figure 4:
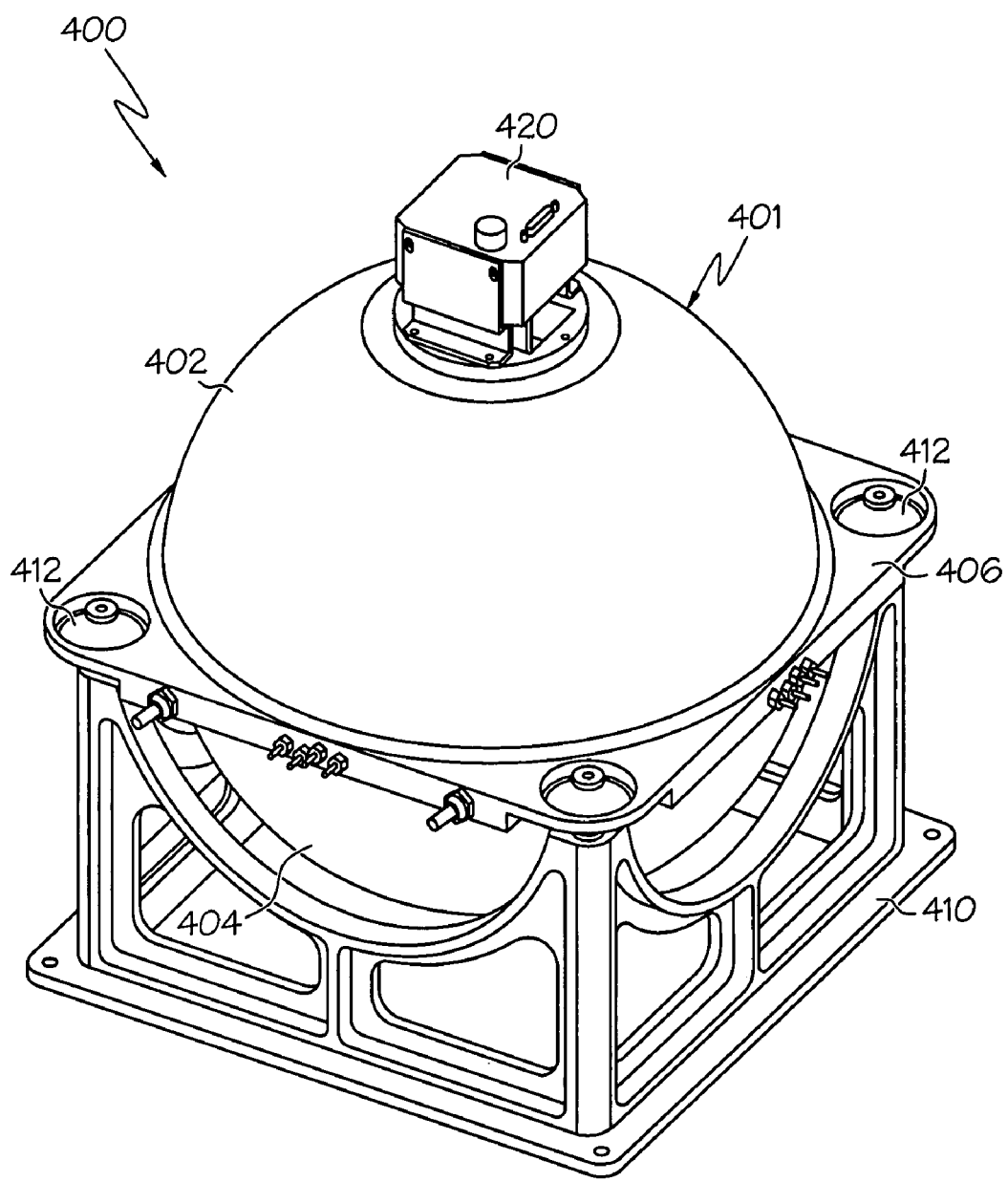
FIG. 4 is a perspective view of an inertial measurement unit that can utilize a wireless power transfer transformer.

FIG. 4 is a perspective view of an inertial measurement unit (IMU) 400 according to one embodiment for use in an inertial navigation system. The IMU 400 can be implemented with a wireless power transfer transformer as discussed previously. The IMU 400 includes a stationary outer case assembly 401 with an upper gas plenum 402 and a lower gas plenum 404. The upper and lower gas plenums surround upper and lower support shells, which in turn surround a spherical sensor assembly in the interior of IMU 400. The gas plenums and support shells are secured to upper and lower surfaces of a mounting plate 406. The lower gas plenum 404 is set in a stationary support frame 410, which can be attached to mounting plate 406 by a set of fasteners 412 located at each corner of mounting plate 406. A monitoring device 420 can be placed on top of upper gas plenum 102 to monitor the rotation and position of the sensor assembly.

The power transfer gap control approach disclosed herein provides power to the sensor assembly by maintaining a narrow gap to allow relative motion between the transmitting core and the receiving core without physical contact. This provides the ability to reposition the sensor assembly in the IMU without creating mechanical wear and therefore increases reliability and product life. By providing a minimal narrow gap between the transmitting core and the receiving core, the efficiency of the power transfer is increased.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An inertial measurement unit, comprising:
    an outer case assembly comprising:
        an upper gas plenum and a lower gas plenum;
        an upper support shell surrounded by the upper gas plenum, the upper support shell having a plurality of apertures; and
        a lower support shell surrounded by the lower gas plenum, the lower support shell having a plurality of apertures;
    a sensor assembly comprising a sensor shell having an outer surface, the sensor assembly surrounded by the upper and lower support shells;
    a plurality of gas bearing pads extending through the apertures in the upper and lower support shells, the plurality of gas bearing pads configured to receive a first pressurized gas from the upper and lower gas plenums and inject the first pressurized gas into a gap that separates the gas bearing pads and the sensor shell, thereby producing a first gas bearing that allows the sensor assembly to be freely suspended and rotated in all directions;
    at least one wireless power transfer transformer comprising:
        a power transmitting core mounted to the outer case assembly; and
        a power receiving core mounted in an opening of the sensor shell, the power receiving core configured to be aligned with the power transmitting core for a wireless power transfer;
    wherein the power transmitting core is configured to inject a second pressurized gas into a gap between the power transmitting core and the power receiving core to produce a second gas bearing that maintains a predetermined separation distance between the power transmitting core and the power receiving core during the wireless power transfer.

2. The inertial measurement unit of claim 1, wherein the sensor shell has a substantially spherical shape.

3. The inertial measurement unit of claim 1, wherein the upper and lower support shells have a substantially hemispherical shape, and the upper and lower gas plenums have a substantially hemispherical shape.

4. The inertial measurement unit of claim 1, wherein the sensor assembly comprises one or more inertial sensors, and one or more rechargeable batteries.

5. The inertial measurement unit of claim 4, wherein the inertial sensors comprise one or more accelerometers, one or more gyroscopes, or combinations thereof.

6. The inertial measurement unit of claim 1, wherein the power transmitting core comprises:
    a hollow mounting stem;
    a gas pad coupled to the hollow mounting stem; and
    a spring cushion joint interposed between the hollow mounting stem and the gas pad.

7. The inertial measurement unit of claim 1, wherein the power receiving core is coupled to charging coil electronics in the sensor assembly.

8. The inertial measurement unit of claim 1, wherein the power transmitting core is coupled to external charging coil electronics.

9. The inertial measurement unit of claim 2, wherein the power receiving core has an outer surface with a substantially spherical concave shape, and the power transmitting core has an outer surface with a corresponding substantially spherical convex shape.

10. The inertial measurement unit of claim 9, wherein the outer surface of the power receiving core is flush with the outer surface of the sensor shell.

11. A method for wireless power transfer in an inertial measurement unit, the method comprising:
    aligning a power receiving core in a sensor assembly with a power transmitting core external to the sensor assembly;

injecting a pressurized gas through the power transmitting core into a controlled gap between the power transmitting core and the power receiving core to produce a gas bearing; and transmitting a wireless power signal from the power transmitting core to the power receiving core.

12. The method of claim 11, wherein the gas bearing maintains a separation distance between the power transmitting core and the power receiving core of about 0.001 inch or less.

13. The method of claim 11, wherein the gas bearing maintains the controlled gap to allow relative motion between the power transmitting core and the power receiving core without physical contact.

14. The method of claim 11, further comprising charging one or more batteries in the sensor assembly with the wireless power signal received by the power receiving core.

15. A wireless power transfer transformer for an inertial measurement unit, comprising:
 a power transmitting core comprising:
  a hollow mounting stem for injecting pressurized gas;
  a gas pad with a central opening coupled to the hollow mounting stem; and
  a spring cushion joint interposed between the hollow mounting stem and the gas pad; and
 a power receiving core configured to align with the power transmitting core and be separated from the power transmitting core by a controlled gap.

16. The wireless power transfer transformer of claim 15, wherein the power receiving core has an outer surface with a substantially spherical convex shape, and the power transmitting core has an outer surface with a corresponding substantially spherical concave shape.

17. The wireless power transfer transformer of claim 15, wherein the spring cushion joint is configured to provide for self alignment, axial motion, and radial adjustment of the power transmitting core to adjust the controlled gap based on the pressurized gas.

18. The wireless power transfer transformer of claim 15, wherein the gas pad has an outer surface with a single coil winding of a magnetic material.

19. The wireless power transfer transformer of claim 18, wherein the power receiving core has an outer surface with a single coil winding of a magnetic material.

20. The wireless power transfer transformer of claim 15, wherein the controlled gap has a distance of about 0.001 inch or less.

* * * * *